United States Patent
Hoeft

(10) Patent No.: US 6,208,370 B1
(45) Date of Patent: Mar. 27, 2001

(54) METHOD AND APPARATUS FOR DETERMINING THE STARTING POSITION AND THE POWER OF A SCANNING LIGHT BEAM TO BE USED IN WRITING ON A MEDIA

(75) Inventor: Jon L. Hoeft, Honeoye Falls, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/218,508

(22) Filed: Dec. 22, 1998

(51) Int. Cl.[7] .................................................. B41J 2/435
(52) U.S. Cl. .......................... 347/250; 347/235; 347/236; 347/246
(58) Field of Search .................................. 347/234, 235, 347/236, 246, 248, 250, 237; 250/205, 559.03, 559.06, 559.13, 559.15, 236, 559.29, 208.01; 72/38; 359/216, 217

(56) References Cited

U.S. PATENT DOCUMENTS

| | | | |
|---|---|---|---|
| 4,306,807 | 12/1981 | Sakane et al. | 356/223 |
| 4,355,860 * | 10/1982 | Lavallee et al. | 359/217 |
| 4,492,858 | 1/1985 | Mizokami | 250/214 P |
| 4,681,441 | 7/1987 | Uchidoi et al. | 356/222 |
| 4,749,275 | 6/1988 | Shimomura et al. | 356/222 |
| 4,955,029 | 9/1990 | Lecey et al. | 372/31 |
| 5,062,114 | 10/1991 | Ito | 372/31 |
| 5,134,273 | 7/1992 | Wani et al. | 250/205 |
| 5,353,048 * | 10/1994 | Kanai | 347/246 |
| 5,357,106 * | 10/1994 | Wilson | 250/236 |
| 5,467,363 | 11/1995 | Okabayashi | 372/38 |
| 5,787,103 | 7/1998 | Coleman | 372/38 |

* cited by examiner

Primary Examiner—N. Le
Assistant Examiner—Hai C. Pham
(74) Attorney, Agent, or Firm—Frank Pincelli

(57) ABSTRACT

A method and apparatus for determining a line start writing position of a scanning light beam in a scanning light beam writing system. A first detector and a second detector are positioned in the scan path of the scanning light beam for detection of the scanning light beam. The information obtained from the detector is used to determine the line start for commencing writing on a media and for monitoring and controlling the power level of the scanning light beam.

4 Claims, 3 Drawing Sheets

METHOD AND APPARATUS FOR DETERMINING THE STARTING POSITION AND THE POWER OF A SCANNING LIGHT BEAM TO BE USED IN WRITING ON A MEDIA

FIELD OF THE INVENTION

The present invention is directed to an apparatus, which uses a scanning light beam, such as a laser light beam, for writing onto a media.

BACKGROUND OF THE INVENTION

In devices for writing onto media using a scanning light beam it is important to know when to turn on and start writing with the scanning light beam. In a typical prior art scanning writing apparatus, a laser light beam or other illuminated light, is directed to a rotating polygon having a plurality of mirror facets which direct the light beam onto a media. Each facet is used to write a successive line of data. These type of systems have the disadvantage of relying on ill-defined specifications for rotating stability of the polygon. Additionally, accumulative error in timing from the first facet to the last facet may occur. Thus, there is a need to provide appropriate timing for line start for each successive facet.

It is also important to maintain a predetermined intensity level of the writing beam. As is typical with writing beams, such as laser beams, over time the intensity can vary, which can affect the overall quality of the writing apparatus. Most systems monitor light beams in the static mode, that is, before scanning. Monitoring may be done right at the output of the laser, or after the acoustic optical modulator (AOM) or attenuator. A hand-held light meter can periodically be inserted into the beam for measuring of the intensity. The problem is that measuring the intensity at these positions does not actually reflect the amount of light that will be hitting the media plane, which may result in erroneous measurements. The intensity of the beam should be measured as close to the writing plane as possible in order to account for all possible attenuation. Another prior art method used to monitor the intensity is to scan and print an image onto a photosensitive material media, for example, photographic paper, then develop the paper and then measure the results of the developed paper with a densitometer. This is a tedious and time-consuming process.

The present invention provides a method for accurately determining a line start for each facet and also provides a method of measuring the light beam amplitude automatically and as close to the focal plane of the media as possible.

SUMMARY OF THE INVENTION

The present invention is directed to overcoming one or more of the problems set forth above. Briefly summarized according to one aspect of the present invention, there is provided a method of determining a line start writing position of a scanning light beam in a scanning light beam writing system, the writing system having a scanning light beam which projects along a scan path on a writing plane from a start position to an end position, a first detector and a second detector positioned in the scan path for detection of the scanning light beam as it is scanned along the scan path for detection of the light beam, the second detector being spaced a predetermined distance from the first detector at a point after the scanning light beam passes the first detector, the method comprising the steps of:

moving the scanning light beam at a known velocity along the scan path from the start position to the end position;

monitoring a first output parameter of the first detector produced by the scanning light beam passing over the first detector;

monitoring a second output parameter of the second detector produced by scanning light beam passing over the second detector;

noting a reference point when the parameter measured by the first and second detectors reach a predetermined relationship; and determining the line start position on the scan path for start of writing by the scanning light beam based on the reference point.

In accordance with another aspect of the present invention there is provided an apparatus for writing onto a media using a scanning light beam, comprising:

a scanning light beam for projecting a scanning path on a writing plane for receiving a photosensitive media for writing thereon, the scanning path having a start position and an end position;

a first detector positioned in the scan path after the start position for detection of the scanning light beam;

a second detector positioned in the scan path at a point after the first detector for detection of the light beam, the second detector being spaced a predetermined distance from the first detector, the first and second detectors producing an output signal in response to the scanning light beam passing over the first and second detectors;

means for noting a reference point when a particular relationship occurs between the value of the output signals produced by the first and second detectors; and means for generating a line start signal in response to the reference point and for commencing writing with the scanning light beam based on the photosensitive media.

In accordance with yet another aspect of the present invention there is provided a method of monitoring and/or calibrating a writing system, the writing system having a scanning light beam which projects along a scan path having a start position and an end position on a writing plane, a first detector positioned in the scan path for detecting the scanning light beam and a second detector positioned after the first detector in the scanning path for detection of the light beam, the second detector being spaced a predetermined distance from the first detector, the method comprising the steps of:

turning on a scanning light beam and moving the scanning light beam at a known velocity along the scanning path at a first power level;

monitoring a first output signal measured by the first detector in response to the scanning light beam passing over the first detector;

noting a reference position when the first output signal reaches a predetermined value and generating a pulse signal based on the reference position;

changing the power level of the scanning beam to a predetermined second level in response to the reference position;

measuring a second output signal measured by the second detector in response to the light beam passing over the second detector; and comparing the second output signal of the scanning light beam with respect to a predetermined reference value and making an adjustment to the power level of the scanning light beam in accordance with the predetermined value.

In still another aspect of the present invention there is provided a scanning light beam writing apparatus, comprising:

a scanning light beam which projects along a scan path having a start position and an end position on a writing plane;

a first detector positioned in the scan path producing a first output signal in response to the scanning light beam passing over the first detector;

a second detector positioned after the first detector in the scanning path for producing a second output signal in response to the scanning light beam passing over the second detector, the second detector being spaced a predetermined fixed distance from the first detector;

means for monitoring the first output signal produced by the first detector as the scanning light beam passes over the first detector;

means for noting a reference position when the first output signal reaches a predetermined value and generating a pulse signal based on the reference position;

means for changing the power level of the scanning beam to a predetermined second level in response to the reference position;

means for measuring the second output signal produced by the second detector when the scanning light beam passes over the second detector;

means for comparing the value of the second signal of the second detector with respect to a predetermined reference value; and means for adjusting the power level of the scanning light beam in accordance with the predetermined value.

The above, and other objects, advantages and novel features of the present invention will become more apparent from the accompanying detailed description thereof when considered in conjunction with the following drawings.

BRIEF DESCRIPTION OF THE DRAWINGS

In the detailed description of the preferred embodiments of the invention presented below, reference is made to the accompanying drawings in which.

DETAILED DESCRIPTION OF THE INVENTION

The present description will be directed in particular to elements forming part of, or in cooperation more directly with, the apparatus in accordance with the present invention. It is understood that elements not specifically shown or described may take various forms well known to those skilled in the art.

The present description will be directed in particular to elements forming part of, or in cooperation more directly with, the apparatus in accordance with the present invention. It is understood that elements not specifically shown or described may take various forms well known to those skilled in the art.

Figure 1:
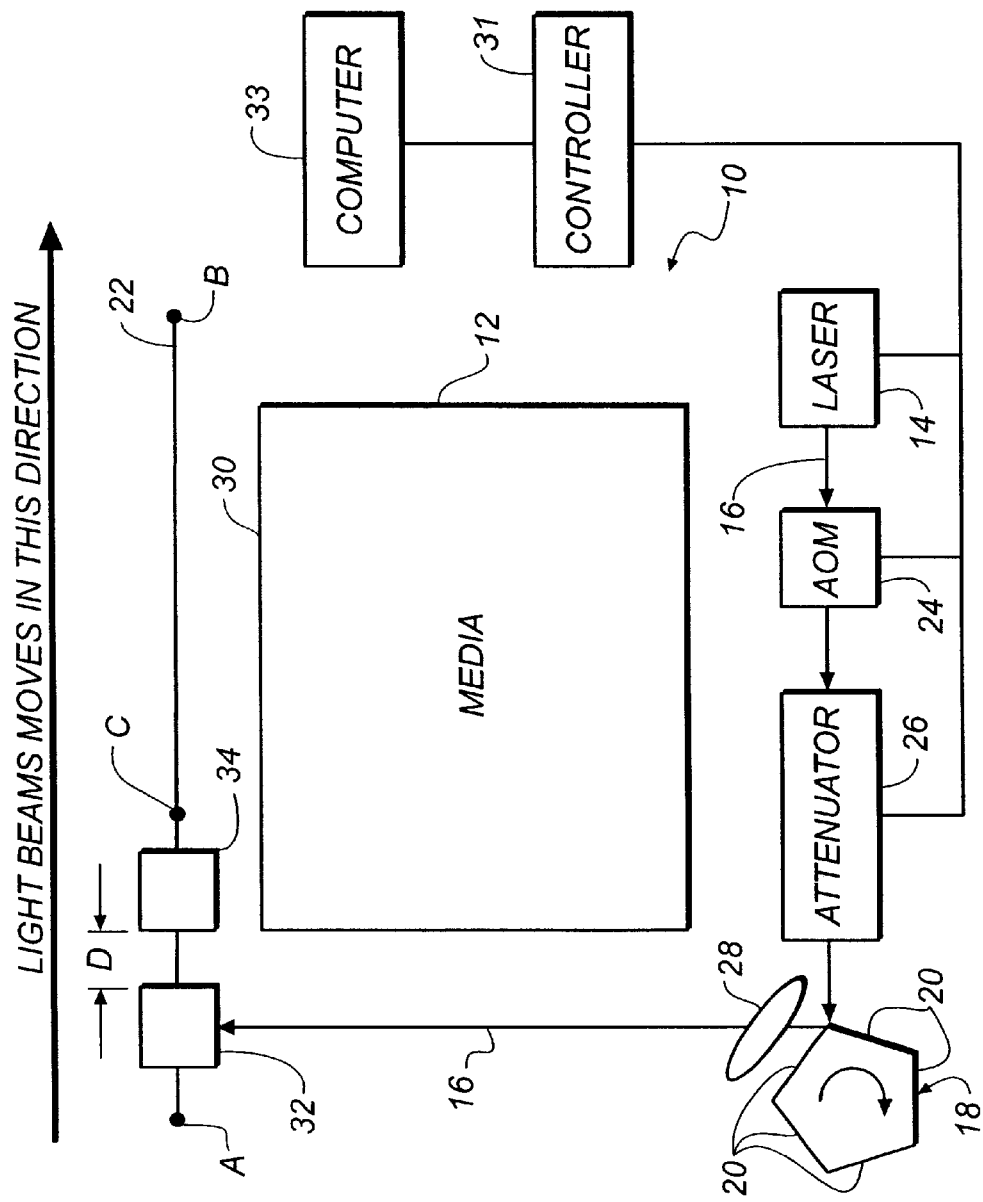
FIG. 1 is a schematic view of a writing apparatus made in accordance with the present invention.

Referring to FIG. 1, there is illustrated a scanning apparatus 10 made in accordance with the present invention. The apparatus 10 includes a light source for producing a beam of light for writing onto a media 12. In the particular embodiment illustrated, the light source is a laser 14, which produces a writing light beam 16, which is directed to a rotating polygon 18 having a plurality of mirror facets 20 for reflecting of the light beam onto a writing path 22 having a starting point A and an ending point B. As is typical with such scanning apparatuses, an acoustic optical modulator 24 and attenuator 26 are used to provide digital data for writing of images onto the media 12. An f-θ lens 28 is provided for properly focusing of the beam onto the writing plane 30 over which the photosensitive media 12 passes. A controller 31 having appropriate circuit boards in conjunction with a computer 33 is provided for controlling operation of apparatus 10 as is customarily done in similar type devices. An appropriate mechanism, not shown, is provided for moving media 12 past writing path 22 for allowing the scanning light beam to write successive lines of digital image data on media 12 as is customarily done in such devices. In the particular embodiment illustrated, the photosensitive media 12 is photographic paper. However, it is to be understood that the photosensitive media 12 may be any other type of media on which the scanning light beam may be used for writing. For example, but not by way of limitation, photographic film, thermal paper and sharable surface used in electrostatic writing.

As illustrated in FIG. 1, a pair of detectors 32,34 are provided in the writing path 22 of the scanning light beam 16 spaced apart a fixed distance D. As can be seen, the detectors 32,34 are positioned after point A where the lighting beam first starts its scanning, but prior to the actual line start position C used for initiating writing onto the media 12. In the particular embodiment illustrated, the detectors 32,34 each comprise a photodiode, which produce a signal in response to the scanning light beam 16 passing thereover. Preferably, the two detectors 32,34 are provided in the same supporting structure so that the distance D can be precisely controlled, which plays an important element in determining the line start position C for initiating writing onto the photosensitive media 12. In the particular embodiment illustrated, the photodetectors 32,34 are provided in a single SPOT-2DM1 detector, which may be purchased from UDT Sensors, Inc. However, it is to be understood that detectors 32,34 may be of any desired construction or manufacture so long as they are capable of producing the appropriate signals in response to the scanning passing thereover as discussed later herein.

Figure 2:
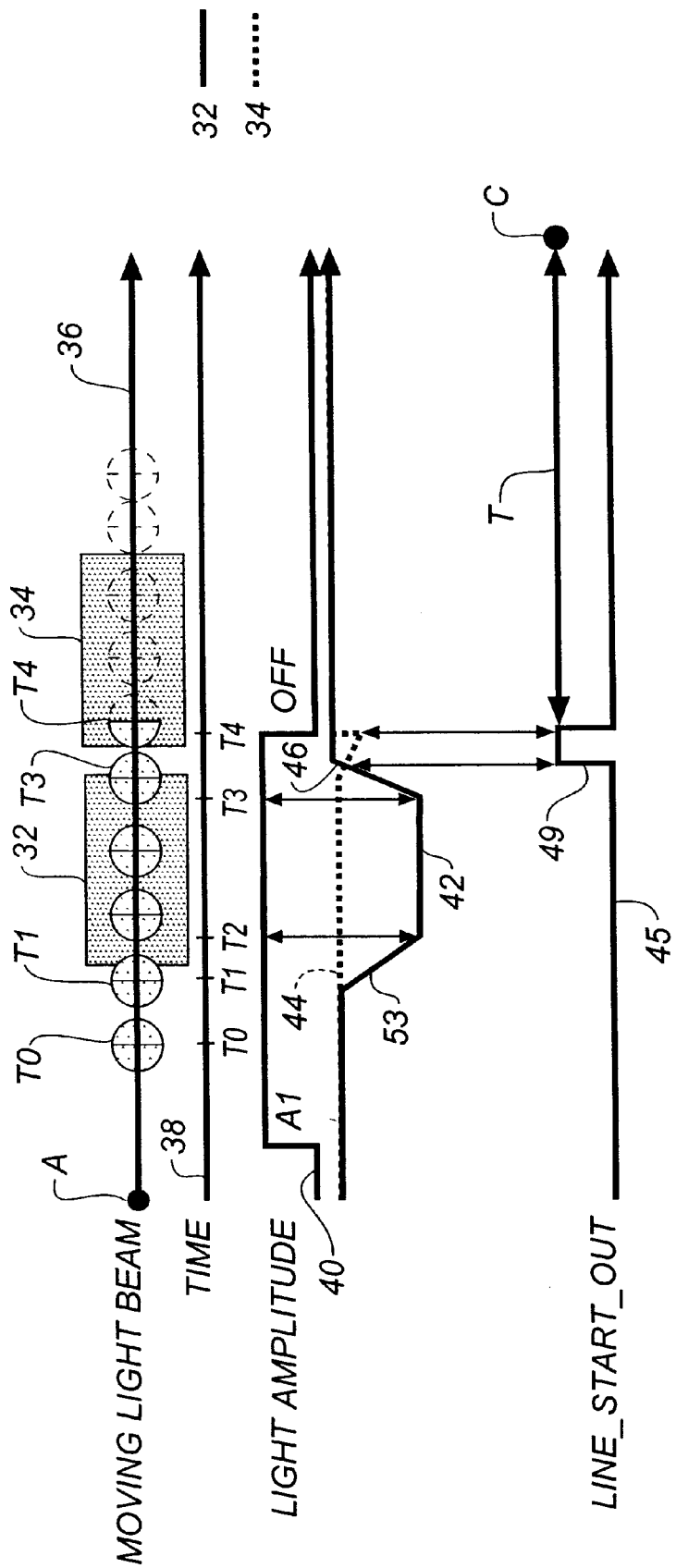
FIG. 2 is a diagrammatic representation illustrating the sensors used for monitoring the scanning light beam for determining line start and respective time lines for various signals associated therewith as a function of time.

Referring to FIG. 2, there is illustrated in diagrammatic fashion detectors 32,34 and how the scanning light beam 16 passes thereover and the various signals produced. As can be seen, the scanning light beam 16 starts at point A and travels in the direction indicated by arrow 36 across detectors 32,34. The circles indicated by T0–T9 represent the position and intensity of the beam as it passes detectors 32,34. The time line 38 merely represents the timing sequence of the scanning beam 16 as it passes detectors 32,34 along writing path 22. Line 40 indicates the amplitude of the light beam as it starts from point A as it progresses by the detectors 32,34. Lines 42,44 each represent the output voltage of each of detectors 32,34, respectively, in relationship to the light beam 16 traveling along writing path 22. The two lines 42,44 use the same zero reference for the output voltage. As can be seen, the voltage output of detector 32 increases from approximately T1 to a maximum at point at T2 while the output voltage of detector 34 is zero at T2. As the scanning light beam 16 passes the first detector 32 at T3, the voltage output of the detector 32 begins to decrease. However, at about this point, or shortly thereafter, as indicated by line 44, the voltage output of detector 34 begins to increase in response to the scanning light beam 16. At point 46 it can be seen that the two lines 42,44 cross. This cross-over represents that the output voltage of both detectors 32,34 are the same. At point 46 a line start signal is generated. It is to be understood that the determining of when the line signal based on the cross-over point 45 is generated can be accomplished in any desired manner. In the particular embodiment illustrated, a simple comparator in controller 31 is used for comparing the signals of the outputs of detectors 32,34, thus when the two signals are substantially the same, an output signal 49 is produced. This is used to begin line start at point C. However, as indicated by line 40, a short time period after point 46, the power to the scanning light beam 16 is turned off and then turned back on at point C as determined by a predetermined time period T, which has been preselected, which is based on output signal 49. Because the detectors 32,34 are fixed in relationship to each other, the point 46 at which the voltage output signal of the detectors cross will be substantially at the same point each time the scanning light beam 16 is passed over the detectors. Thus, there is provided a line signal start which can be reliably repeated for use in determining the point for initiating lighting of the laser light beam as indicated by point C. The laser, at point C, is turned on to the appropriate level and the appropriate digital data is fed through the AOM 24 for writing on media 12. It is, of course, understood that the laser light beam 16 may be turned on just prior to the time point C, the time at which digital data is provided for modulating of the light beam 16 and actual writing commences.

Figure 3:
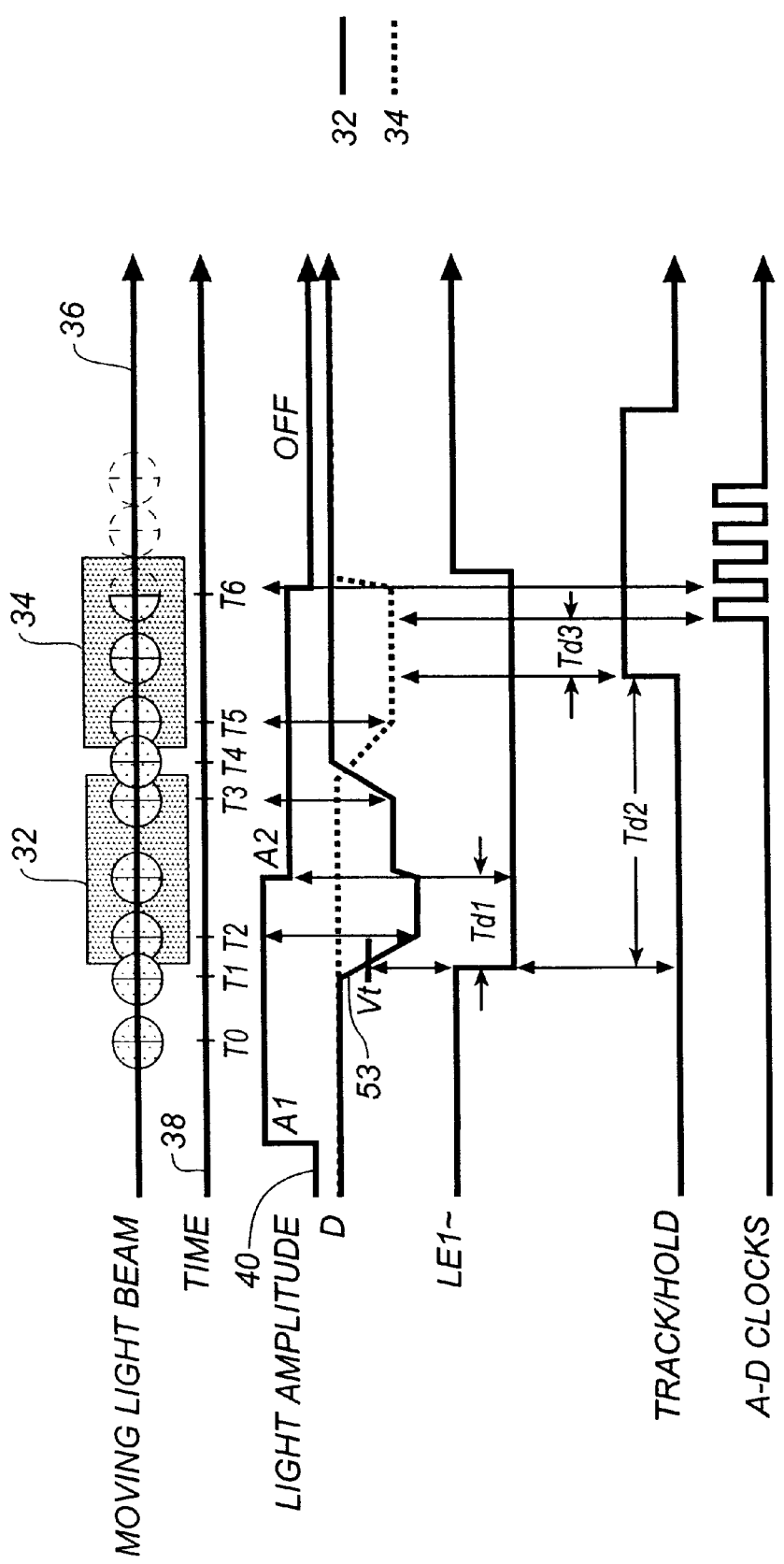
FIG. 3 is a diagrammatic representation illustrating the detectors used for monitoring the power level of the scanning light beam and various signals associated therewith as a function of time.

Referring to FIG. 3, there is illustrated a diagrammatic representation similar to FIG. 2, like numerals indicating like parts and sequences. FIG. 3 illustrates how the intensity of the scanning light beam 16 can be monitored and controlled accurately during each scan and at the writing plane 30 of the media 12. When the light beam 16 is detected by detector 32, the output signal begins to increase in amplitude as indicated by numeral 53. The output signal being directly related to the power level of the laser 14, thus the power level of laser can be readily determined. If the detector was previously calibrated to a standard source, the absolute power level of the laser could be determined. When the output signal passes through a threshold VT, a signal LE1 is generated using a comparative circuit provided in controller 31. Then a control circuit, also provided in controller 31, senses the LE1 signal and the intensity of light beam 16 is changed to an amplitude A2 at a time delay of Td1 after the circuit senses that threshold VT has been reached. A track and hold circuit is provided in controller 31 for monitoring the voltage of detector 32 and holding it a certain length of time after a predetermined time period Td2 after VT. By this time, the amplitude of the laser 14 has been lowered to amplitude A2. An A/D clock in controller 31, using the appropriate clock scheme, takes the voltage as determined by the track and hold circuit so as to convert the analog voltage to a digital value for later processing. Thus, the amplitude of the second detector 34 is captured which can be compared with the power measurement levels previously obtained for the scanning light beam 16, and if power measurement level has changed, appropriate control of the light beam 16 may be adjusted. For example, if over time the measured amplitude of the laser has been reduced, the power to the laser 14 is increased appropriately to the desired power level. If the measured power level, as obtained by the output signal of sensor 34, is too high, appropriate reduction in power level is made. The present invention, however, can automatically take power measurements during each scan, compare it to prescribed limits and appropriate adjustments may be made.

In the preferred embodiment illustrated, the output current of the detectors was converted to a voltage and monitored. However, the present invention is not so limited. However, if desired, a different output parameter of the detectors 32,34 may be monitored, for example, but not by way of limitation, the output current of the detectors may be monitored directly. Thus, when the value of the current for both detectors reach the same value the line start signal can be generated as previously discussed.

Also, the present invention is not limited with respect to the relation that the voltage (or current) of the detectors may be the same. For example, but not by way of limitation, when the voltage of the second detector is one-half of the first voltage, some other relationship can be used for determining the line start signal.

The invention has been described in detail with particular reference to certain preferred embodiments thereof, but it will be understood that variations and modifications can be effected within the scope of the invention, the present invention be limited by the claims that follow.

PARTS LIST

T0–T9 Circles
10 Apparatus
12 Media
14 Laser
16 Light beam
18 Rotating polygon
20 Mirror facets
22 Writing path
24 Acoustic optical modulator
26 Attenuator
28 f-θ lens
30 Writing plane
31 Controller
32 Photodetectors
33 Computer
34 Photodetectors
36 Arrow
38 Time line
40 Line
42,44 Lines
45 Point
46 Point
49 Output signal
53 Increase in amplitude
62 Scanning light beam

What is claimed is:

1. A method of monitoring and/or calibrating a writing system, said writing system having a scanning light beam which projects along a scan path having a start position and an end position on a writing plane, a first detector positioned in said scan path for detecting said scanning light beam and a second detector positioned after said first detector in said scanning path for detection of said light beam, said second detector being spaced a predetermined distance from said first detector, said method comprising the steps of:

turning on a scanning light beam and moving said scanning light beam along said scanning path at a first power level;

monitoring a first output signal produced by said first detector in response to said scanning light beam passing over said first detector;

noting a reference position when said first output signal reaches a predetermined value and generating a pulse signal based on said reference position;

changing the power level of said scanning beam to a predetermined second level in response to said reference position;

measuring a second output signal produced by said second detector in response to said light beam passing over said second detector;

comparing the said second output signal produced by said second detector of said scanning light beam with respect to a predetermined reference value and making an adjustment to the power level of said scanning light beam in accordance with said predetermined reference value.

2. A method according to claim 1 wherein said first and second detectors each comprises a photodiode.

3. A method according to claim 1 wherein said output signals are voltage or current produced by said first and second detectors as said scanning light beam passes over said detectors.

4. An scanning light beam writing apparatus, comprising:

a scanning light beam which projects along a scan path having a start position and an end position on a writing plane;

a first detector positioned in said scan path producing a first output signal in response to said scanning light beam passing over said first detector;

a second detector positioned after said first detector in said scanning path for producing a second output signal in response to said scanning light beam passing over said second detector, said second detector being spaced a predetermined fixed distance from said first detector;

means for monitoring said first output signal produced by said first detector at a first power level as said scanning light beam passes over said first detector;

means for noting a reference position when said first output signal reaches a first predetermined value and generating a pulse signal based on said reference position;

means for changing said first power level of said scanning beam to a predetermined second level in response to said reference position;

means for measuring said second output signal produced by said second detector when said scanning light beam passes over said second detector;

means for comparing the value of said second signal of said second detector with respect to a predetermined reference value; and means for adjusting the power level of said scanning light beam in accordance with a second predetermined value.

* * * * *